(12) United States Patent
Hüthwohl

(10) Patent No.: US 9,273,580 B2
(45) Date of Patent: Mar. 1, 2016

(54) METERING SYSTEM FOR INJECTING A REDUCING AGENT INTO THE EXHAUST GAS FLOW OF AN INTERNAL COMBUSTION ENGINE

(75) Inventor: Georg Hüthwohl, Soest (DE)

(73) Assignee: Albonair GmbH, Dortmund (DE)

( * ) Notice: Subject to any disclaimer, the term of this patent is extended or adjusted under 35 U.S.C. 154(b) by 0 days.

(21) Appl. No.: 13/254,198

(22) PCT Filed: Feb. 24, 2010

(86) PCT No.: PCT/EP2010/001141
§ 371 (c)(1),
(2), (4) Date: Sep. 1, 2011

(87) PCT Pub. No.: WO2010/115487
PCT Pub. Date: Oct. 14, 2010

(65) Prior Publication Data
US 2012/0036835 A1     Feb. 16, 2012

(30) Foreign Application Priority Data
Apr. 9, 2009  (DE) .......................... 10 2009 016 810

(51) Int. Cl.
*F01N 3/00*   (2006.01)
*F01N 3/20*   (2006.01)
*F02B 37/16*  (2006.01)

(52) U.S. Cl.
CPC ............ *F01N 3/2066* (2013.01); *F02B 37/164* (2013.01); *F01N 2610/02* (2013.01); *F01N 2610/08* (2013.01); *Y02T 10/144* (2013.01); *Y02T 10/24* (2013.01)

(58) Field of Classification Search
CPC ............... F01N 3/10; F01N 3/38; F01N 3/20; F01N 3/2066; F01N 2610/08; F01N 2610/085; F01N 2610/02; F02B 37/164; Y02T 10/144; Y02T 10/24

USPC .............. 60/605.2, 607, 272–324, 598, 605.1
See application file for complete search history.

(56) References Cited

U.S. PATENT DOCUMENTS 3,775,971 A * 12/1973 Gadefelt .......................... 60/606
3,911,674 A * 10/1975 Goto et al. ....................... 60/278

(Continued)

FOREIGN PATENT DOCUMENTS

DE     2027883 A1    12/1971
DE     2216059 A1    10/1972

(Continued)

OTHER PUBLICATIONS

International Search Report, PCT/EP/2010/001141

(Continued)

*Primary Examiner* — Jesse Bogue
*Assistant Examiner* — Kelsey Stanek
(74) *Attorney, Agent, or Firm* — Law Office of Robert F. Zielinski LLC

(57) ABSTRACT

The invention relates to a reducing agent metering system, and to a method for controlling the injection of a reducing agent into the exhaust gas flow (9) of a turbocharged internal combustion engine for selective catalytic reduction, wherein the metering system can be connected to a reducing agent tank (1), from which reducing agent can be removed, wherein the metering system comprises at least one nozzle (5) through which the reducing agent can be injected by means of compressed air into the exhaust gas flow (9), wherein at least one part of the compressed air is taken from a charger of the internal combustion engine, wherein the compressed air supply (6) comprises an electric air pump (7) for generating compressed air, and comprises a bypass (19) in parallel with the air pump (7), so that the charge air of the turbocharger flows over or can flow over the air pump (7).

18 Claims, 1 Drawing Sheet

(56) References Cited

U.S. PATENT DOCUMENTS

| | | | |
|---|---|---|---|
| 5,205,120 A * | 4/1993 | Oblander et al. | 60/284 |
| 5,878,567 A * | 3/1999 | Adamczyk et al. | 60/274 |
| 6,363,771 B1 * | 4/2002 | Liang et al. | 73/23.31 |
| 6,845,611 B2 | 1/2005 | Huthwohl et al. | |
| 7,337,607 B2 * | 3/2008 | Hou et al. | 60/274 |
| 7,409,823 B2 * | 8/2008 | Price et al. | 60/307 |
| 2005/0011184 A1 | 1/2005 | Price et al. | |
| 2005/0109029 A1 | 5/2005 | Busch | |
| 2007/0277514 A1 | 12/2007 | Kammel | |
| 2010/0115932 A1 * | 5/2010 | Kassel et al. | 60/299 |
| 2010/0122521 A1 * | 5/2010 | Sun et al. | 60/284 |

FOREIGN PATENT DOCUMENTS

| | | |
|---|---|---|
| DE | 4041628 A1 | 12/1990 |
| DE | 20119514 U1 | 2/2002 |
| EP | 1524417 A1 | 10/2004 |
| EP | 1826371 A1 | 2/2007 |
| GB | 1444587 A | 8/1976 |
| JP | 2003343245 A | 12/2003 |
| WO | 2007091969 A1 | 8/2007 |

OTHER PUBLICATIONS

German Search Report regarding DE 10 2009 016 810.9.

* cited by examiner

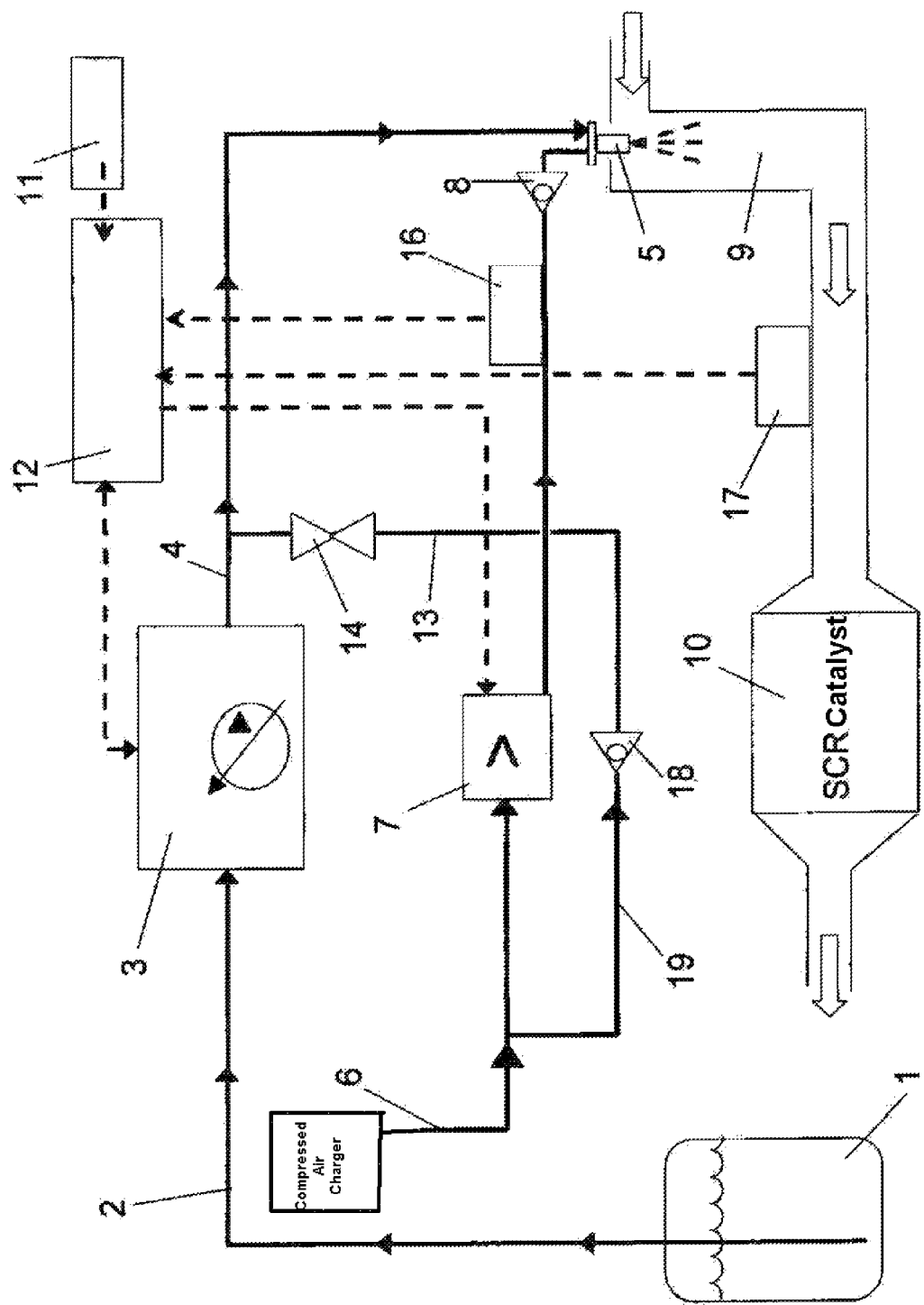

METERING SYSTEM FOR INJECTING A REDUCING AGENT INTO THE EXHAUST GAS FLOW OF AN INTERNAL COMBUSTION ENGINE

CROSS-REFERENCE TO RELATED PATENT APPLICATION

The present application is a U.S. national stage application under 35 U.S.C. §371 of German Patent Application No. 10 2009 016 810.9; filed Apr. 9, 2009; the entirety of which is incorporated herein by reference.

The invention relates to a reducing agent metering system for injecting a reducing agent into the exhaust gas flow of a supercharged internal combustion engine for selective catalytic reduction, the metering system being connectable to a reducing agent tank from which reducing agent can be taken, the metering system having at least one nozzle by which the reducing agent can be injected into the exhaust gas flow by means of compressed air, at least one part of the compressed air being taken from a charger of the internal combustion engine. Furthermore the invention relates to a method for controlling the injection of a reducing agent by means of compressed air into the exhaust gas flow of an internal combustion engine for selective catalytic reduction.

Metering systems for injecting a urea solution into the exhaust gas flow are known. For this purpose a urea solution is defined as both ammonia and also urea solution or especially so-called AdBlue, i.e. a urea solution according to DIN 70070. So-called SCR catalytic converters are used to reduce the emission of nitrogen oxides from diesel engines. For this purpose a reducing agent is injected into the exhaust gas system with a metering device. Ammonia is used as the reducing agent.

Since the carrying of ammonia in motor vehicles is a safety issue, urea is used in aqueous solution with a conventionally 32.5% urea portion. In the exhaust gas the urea decomposes at temperatures above 150° Celsius into gaseous ammonia and $CO_2$. The parameters for the decomposition of the urea are essentially time (vaporization time and reaction time), temperature and the droplet size of the injected urea solution. In these SCR catalytic converters selective catalytic reduction (SCR) reduces the emission of nitrogen oxides by roughly 90%.

Diverse systems for injection of urea as the reducing agent are known. The injection of urea can be supported by compressed air. The compressed air is used as the energy supply medium. This is advantageous for achieving small droplets. The urea solution is metered by means of a metering system, injected into the exhaust gas flow, and provides for the desired chemical reaction in the SCR catalytic converter. In this connection the nitrogen oxides are converted into nitrogen and water vapor.

DE 201 19 514 U1 discloses a reducing agent metering means in which compressed air is made available for the formation of an aerosol by the charging air of a supercharger group of the internal combustion engine. This enables the use of a metering system even in vehicles and machines which do not have their own compressed air supply and whose engine is however supercharged.

The disadvantage here is that for sufficient supply with compressed air a minimum engine speed is necessary and the compressed air is available only after a certain interval of operation. But at other operating points, for example at low rpm and/or engine load, a sufficient compressed air supply is not ensured by the engine charger.

The object of the invention is to overcome these disadvantages and to develop a generic metering means and an operating method such that adding a reducing agent to reduce the exhaust gas pollutants is possible independently of the instantaneous operating point of the internal combustion engine.

This object is achieved as claimed in the invention by a metering system as claimed in claim 1 and by a method for controlling the injection of a reducing agent as claimed in claim 13. Advantageous configurations of the invention are given in the respective dependent claims.

In the reducing agent metering system for injection of a reducing agent into the exhaust gas flow of a supercharged internal combustion engine for selective catalytic reduction, the metering system being connectable to a reducing agent tank from which the reducing agent can be taken, the metering system having at least one nozzle by which the reducing agent can be injected by means of compressed air into the exhaust gas flow, at least one part of the compressed air being taken from a charger of the internal combustion engine, it is especially advantageous that the compressed air supply has an electric air pump for producing compressed air and parallel to the air pump has a bypass so that the charging air of the charger overflows/can overflow the air pump via the bypass.

A supercharged engine is therefore an engine with a supercharging group which can be an exhaust gas turbocharger and/or a compressor. In addition, as claimed in the invention an electric air pump such as for example a membrane compressor or the like is integrated into the compressed air supply line. The charging air, i.e. the compressed air portion which is taken from the engine charger can flow parallel to the partial line containing the air pump, therefore can overflow the pump via a bypass which is integrated into the line of the compressed air supply of the metering system and which is connected parallel to the air pump in terms of flow engineering. I.e., that an overflow channel, i.e. an overflow line, runs parallel to the air pump.

Thus, in the metering system as claimed in the invention for injection of a reducing agent, for example a urea solution, into the exhaust gas flow the compressed air supply is provided by a charger of the supercharged internal combustion engine and optionally alternatively or cumulatively by an electric air pump which can be turned on as necessary. In this way, at all operating points of the engine a compressed air supply of the reducing agent metering system is ensured. The system can be used in all vehicles and machines with supercharged engines, but these vehicles do not require their own compressed air supply, as is conventionally provided in commercial vehicles in the form of an additional compressed air system. The system as claimed in the invention can thus be used very advantageously in all machines and vehicles which do not have their own compressed air supply, but whose internal combustion engine is supercharged.

At the operating points of the engine at which sufficient charging pressure of the supercharger, therefore for example of a turbocharger or a compressor, is available, the charging air, i.e. a part of the charging air removed for this purpose, is used for atomization of the reducing agent solution, the electric compressor provided as claimed in the invention working only at low load or low rpm in order to make available the compressed air which is required for the metering system.

It is especially advantageous that the service life of the electric motor of the air pump and the service life of the air pump itself are saved, since operation of the air pump takes place only at the operating points of the internal combustion engine in which on the side of the charger of the supercharged internal combustion engine sufficient charging pressure in the charging air is not available. Also the only occasionally necessary engagement of the electric air pump prevents the vehicle's electrical network from being unnecessarily loaded, since the vehicle network must make available the electrical output necessary for operation of the pump.

The formulation that at least part of the compressed air is taken from the charger of the internal combustion engine in the following means that the compressed air which is necessary for the metering system is taken in wide operating ranges from the charging group of the supercharged internal combustion engine and thus the electric air pump is used only at times and in support mode, therefore temporarily, for air compression. But it is also possible to use the electric air pump in addition to the supercharger of the engine as a compressed air source.

Here the charger can be a turbocharger or a compressor which is driven directly by the internal combustion engine.

Preferably the bypass has a nonreturn valve. On the one hand, this prevents backflow of compressed air of the electric air pump via the bypass, on the other hand this pressure-actuated valve opens automatically as soon as a sufficient charging pressure of the charger is available so that the charging air can then be used for atomization of the reducing agent.

Especially preferably downstream of the air pump and the bypass there is a pressure sensor so that the air pump is/can be turned on/off depending on the pressure which has been measured by means of the pressure sensor.

The prevailing air pressure can be detected by the arrangement of the pressure sensor in the compressed air line of the metering system downstream of the air pump and the bypass. If the prevailing pressure exceeds the delivery pressure of the air pump, sufficient charging air from the charger of the internal combustion engine is available so that the electric air pump can be turned off. Conversely the air pump is turned on when the air pressure falls below a definable value, i.e. when the charging air of the charging group of the internal combustion engine is too low.

In one especially preferred embodiment the metering system receives a signal of the exhaust gas mass flow from the engine control. The exhaust gas mass flow is computed by the engine control device from the intaken air mass flow and fuel mass flow and is made available as a signal of the exhaust gas mass flow. Alternatively the metering system has a sensor for measuring the exhaust gas mass flow. Preferably the metering system alternatively or cumulatively has a sensor for measuring the exhaust gas temperature.

From the exhaust gas mass flow signal and/or the exhaust gas temperature it is possible to detect the operating parameters which depend on the respective engine operating point, the exhaust gas temperature and/or exhaust gas mass flow, and to evaluate them via the corresponding control electronics of the metering system and to regulate the pressure and/or the amount of air and/or the electric air pump and/or the valve opening times of the compressed air supply depending on the measured operating parameters.

The variables for matching the metering of the amount of air are especially the following:
  exhaust gas temperature
  exhaust gas mass flow
  urea mass flow
  required efficiency of the catalytic converter
  catalytic converter size
  treatment distance between urea injection and catalytic converter.

With the metering system as claimed in the invention it is thus possible to optimize the amount of air at any individual operating point depending on the respective boundary conditions.

In one especially preferred embodiment the compressed air supply has a throttle valve. The arrangement of a throttle valve makes it possible to reduce the air pressure accordingly in the compressed air system before supply to the nozzle.

In one especially preferred embodiment the metering system has a metering pump for conveying the reducing agent solution, especially the urea solution. In particular this metering pump can be a controllable metering pump with respect to the delivered mass flow of urea solution so that the delivery amount of urea solution can be matched to the respective operating point by corresponding triggering of the metering pump.

The term reducing agent forms the generic term for the term urea solution, but otherwise within the framework of this description both terms are used synonymously, i.e. the terms urea solution and urea or reducing agent are used synonymously since conventionally a urea solution is used as a reducing agent for selective catalytic reduction.

Preferably between the reducing agent line and a line of the compressed air supply there is a connecting line, the connecting line having a switching valve, especially a solenoid valve.

In order to completely interrupt the air supply in metering pauses, it is necessary to remove the urea from the hot regions in order to avoid formation of deposits. In the other case the urea would decompose at high temperatures and lead to deposits and thus to clogging. By placing a compressed air line, i.e. a connecting line between the reducing agent line, i.e. the urea line, and a line of the compressed air supply, these deposits can be prevented by the urea formation in metering pauses being blown clear by means of compressed air. A solenoid valve is inserted into this connecting line and which is opened for blowing out the urea line at the existing air pressure in the air line, therefore preferably with the air pump turned on.

This switching valve is closed in metering operation. In order to blow out the urea line with compressed air, the urea delivery by the metering pump is turned off and the switching valve is opened. This yields a pressure drop in the metering line and the compressed air drives the urea into the exhaust gas system. The line is thus blown clear. After a brief air blast the urea is blown out of the metering nozzle and the air supply can be completely turned off.

Preferably the metering system has a control device by means of which the air pump and/or a throttle valve and/or a metering pump and/or a compressed air compressor is/can be controlled depending on the measured values which have been detected by the sensor or sensors.

The arrangement of one such control device which controls one or more components of the metering system depending on the sensor measured values, i.e. depending on the current operating parameters, optimization of the operation of the metering system, i.e. especially air optimization, can be accomplished in an especially advantageous manner. It is thus possible by means of this control device to optimally adapt the delivery amount of urea and the delivery amount of air to the current operating parameters of the internal combustion engine and of the catalytic converter for selective catalytic reduction and thus to regulate them.

Preferably the metering system has a reducing agent solution tank, especially a urea solution tank. Because the metering system itself has one such tank, it is possible to retrofit the metering system in corresponding environments in which a urea solution tank is not already present.

In one preferred embodiment the metering system has a binary nozzle. The binary nozzle is especially preferably an externally mixing nozzle.

The method as claimed in the invention for controlling the injection of a reducing agent, especially a urea solution, by means of compressed air in the exhaust gas flow of a supercharged internal combustion engine for selective catalytic reduction is preferably made such that the amount of compressed air which is necessary for atomization or injection of the reducing agent is taken from the charging air of a charger of the internal combustion engine, when a minimum pressure of the charging air is not reached an electric air pump being temporarily turned on.

Preferably when the injection of reducing agent is interrupted or terminated, especially urea solution, the reducing agent is removed from the lines carrying the reducing agent by means of compressed air.

The problem is that the urea at high temperatures can decompose above roughly 200° C. and it forms deposits which are difficult to remove. These deposits can clog the nozzles. The compressed air can therefore be advantageously used to additionally cool the urea nozzle at high exhaust gas temperatures.

The method is therefore preferably configured such that the delivery of the urea solution is ended or interrupted in time before ending or interruption of compressed air delivery and the compressed air after interruption or termination of delivery of the urea solution is used to clean the parts carrying the urea solution by means of compressed air. In this way the urea is removed especially from the hot regions of the metering system. Otherwise the urea would decompose at high temperatures and form deposits and could lead to clogs.

In order to blow out the urea line with compressed air, the delivery of urea by the metering pump is shut off and the switching valve in the connecting line between the compressed air line and reducing agent line is opened. As a result a pressure drop in the metering line is formed so that the compressed air drives the urea into the exhaust gas system and thus the urea-carrying line is blown clear. After a brief air blast the urea is blown out of the metering nozzle and the air supply can likewise be completely shut off.

Interrupting or ending the injection of urea solution can thus take place by shutting off the metering pump.

Before metering is turned on again, it is a good idea to first set the compressed air to a value which is above the normal metering air supply in order to cool the nozzle before the urea enters it.

Blowing out the urea from the lines is likewise advantageous when the entire system is being turned off. Urea solution freezes at temperatures below −11° Celsius. In this connection the urea water solution expands by roughly 10%. This leads to a freezing pressure by which components could be destroyed. Therefore it is advantageous to blow the urea out of the nozzles and optionally lines and pressure sensors before the system is completely turned off.

This can take place especially by the entire system being cleaned by means of compressed air after ending of urea delivery, i.e. the urea is blown out of the system by means of compressed air.

Preferably triggering of at least one metering pump and/or at least one air pump and/or at least one air control valve and/or one switching valve takes place depending on the operating parameters exhaust gas temperature and exhaust gas mass flow in the method as claimed in the invention for controlling the injection of urea solution. For this purpose the operating parameters which are detected differently can be evaluated by means of a corresponding control device so that triggering of the components can take place exactly.

The figure schematically shows one exemplary embodiment of a metering system as claimed in the invention for injection of the urea solution into the exhaust gas flow of a supercharged internal combustion engine; the embodiment is explained below.

FIG. 1 shows a diagram of a reducing agent metering system as claimed in the invention.

FIG. 1 shows a schematic of one embodiment of the reducing agent metering system. The reducing agent is preferably urea solution with 32.5% urea portion in aqueous solution according to DIN 70070.

Urea is intaken from a tank 1 via an intake line 2 from the metering pump 3. The metering pump 3 is for example a membrane pump or a piston pump which with each stroke delivers a defined amount of urea solution and thus meters it uniformly. The urea is routed to a binary nozzle 5 via a pressure line 4. The binary nozzle 5 is preferably an externally mixing nozzle in which an air jet atomizes the urea.

Compressed air (charging air) is removed via the compressed air line 6 from the charger of the supercharged internal combustion engine, which charger is not shown. The line carrying the compressed air has a switchable electric air pump 7. The air pump 7 can be overflowed with compressed air via the bypass 19 which is connected in parallel. The bypass 19 has a nonreturn valve 18 which opens when a corresponding pressure prevails in the compressed air line 6.

When the charging pressure in the line 6 exceeds the opening pressure of the nonreturn valve 18 in the bypass 19, the electric air pump 7 is overflowed. In this case the higher pressure of the charging air prevails on the pressure sensor 16 which is located downstream of the bypass 19 and the air pump 7. The measured value of the sensor 16 is transferred to the control electronics 12 so that the electric air pump 7 can be turned off by the electronics 12.

Other input variables for controlling the metering pumps by means of the electronic control unit 12 are engine data such as the exhaust gas mass flow which are transferred from the engine electronics. Furthermore the exhaust gas temperature, determined by the temperature sensor 17, and the pressure of the compressed air on the sensor 16 upstream of the binary nozzles 5 [sic]. The pressure upstream of the binary nozzle 5 is a measurement for the volumetric flow of air which has passed through. The air is routed to the binary nozzle 5 via a compressed air line and a nonreturn valve 8. The urea is atomized by the compressed air in the binary nozzle 5 and is supplied to the exhaust gas flow 9.

To detect the operating parameters which include exhaust gas mass flow, air pressure and exhaust gas temperature there are a sensor 11 for detecting the exhaust gas mass flow, a pressure sensor 16 for detecting the pressure of the compressed air upstream of the binary nozzle 5, and a temperature sensor 17 for detecting the exhaust gas temperature in the exhaust gas flow 9. In one alternative which is not shown the exhaust gas mass flow signal is made available by the engine control. The measured values of the sensors 11, 16, 17 are supplied to the control unit 12.

The flow of sensor signals or control signals is shown in the figure by the broken-line arrows.

In the control unit 12 the detected sensor data and engine data are evaluated and the electric air pump 7 is triggered when the pressure of the charging air is too low, and the metering pump 3 is triggered depending on the instantaneous operating data. The tip of the binary nozzle 5 is located in the exhaust gas flow 9. The urea is routed to SCR catalytic converter 10 via the exhaust gas line. Here a large part of the liquid droplets vaporize. The urea is converted into ammonia. In the catalytic converter 10 itself the emission of nitrogen oxides from the engine is reduced with ammonia.

The nonreturn valve 8 in the compressed air line upstream of the binary nozzle 5 prevents the urea from being forced into the compressed air lines in case of possible clogs of the nozzle 5.

The compressed air line is connected to the urea line 4 via the line 13. In the illustrated exemplary embodiment this branch 13 of the compressed air line is located downstream of the air pump 7 and bypass 19. The line 13 has a switchable solenoid valve 14. During metering operation the switching valve 14 in the connecting line 13 is closed. The compressed air flows through the nozzle 5. If the switching valve 14 is opened with the metering pump 3 turned off, air flows into the pressure line 4 of the urea. The urea in the line 4 and nozzle 5 is expelled. With it the region of the nozzle 5 is free of urea after the engine is shut off and is thus resistant to freezing. In operation of the engine at high exhaust gas temperatures without metering deposits cannot form.

The invention claimed is:

1. Reducing agent metering system for injecting a reducing agent into an exhaust gas flow of a supercharged diesel engine for selective catalytic reduction;
   wherein the metering system is connected to a reducing agent tank from which a reducing agent can be taken, and wherein the metering system has at least one nozzle by which the reducing agent can be injected into the exhaust gas flow by a compressed air supply;
   wherein at least one part of the compressed air supply is taken from the supercharger of the diesel engine, and further includes an electric air pump for producing compressed air and wherein the pump is temporarily activated when a minimum pressure of the charging air is not reached, and wherein parallel to the air pump, there is a bypass for bypassing the air pump when the pressure of the charging air of the charger exceeds the air pump pressure;
   and further wherein downstream of the air pump and the bypass there is a pressure sensor so that the air pump is turned on or off depending on the pressure which has been measured by the pressure sensor and wherein the metering system has a binary nozzle comprising an externally mixing nozzle.

2. Metering system as claimed in claim 1 wherein the bypass has a non-return valve.

3. Metering system as claimed in claim 1 wherein the charger is a turbocharger or a compressor which is driven directly by the internal combustion engine.

4. Metering system as claimed in claim 1 wherein the metering system further comprising an electronic control unit for computing the exhaust gas mass flow or a sensor for measuring the exhaust gas mass flow.

5. Metering system as claimed in claim 1 wherein the metering system has a sensor for measuring the exhaust gas temperature.

6. Metering system as claimed in claim 1, further comprising a throttle valve operatively connected to said compressed air supply.

7. Metering system as claimed in claim 1 wherein the metering system has a metering pump for delivering the reducing agent.

8. Metering system as claimed in claim 1, wherein between a reducing agent line and a line of the compressed air supply there is a connection line, the connection line having a switching valve, comprising a solenoid valve.

9. Metering system as claimed in claim 1, wherein the metering system has a control device by means of which the air pump, a throttle valve or a metering pump is controlled depending on the measured values which have been detected by at least one sensor selected from the group comprising exhaust gas mass flow sensor, pressure sensors and exhaust gas temperature sensors.

10. Metering system as claimed in claim 1, wherein the metering system has a reducing agent tank, comprising a urea solution tank.

11. A method for controlling the injection of a reducing agent in a reducing agent metering system by means of compressed air supply into the exhaust gas flow of a supercharged diesel engine for selective catalytic reduction comprising the steps of:
   providing a compressed air charger for producing compressed air and;
   providing an electric air pump parallel to the compressed air charger and a bypass so that the compressed air of the charger overflows/can overflow the air pump via the bypass and downstream of the air pump and the bypass, providing a pressure sensor;
   providing an externally mixing binary nozzle for mixing of the compressed air and the reducing agent; and
   injecting the reducing agent into the exhaust gas flow,
   wherein the amount of compressed air which is necessary for atomization of the reducing agent via the externally mixing binary nozzle is taken, at least in part, from the charging air of the supercharger of the diesel engine,
   and wherein the pressure of the charging air downstream of the air pump is sensed by means of a pressure sensor and further wherein the electric air pump is temporarily activated when a minimum pressure of the charging air is not reached.

12. Method as claimed in claim 11, wherein when the injection of reducing agent comprising a urea solution, is interrupted or terminated, the reducing agent is removed from the line carrying the reducing agent by means of compressed air.

13. Method as claimed in claim 11, wherein interrupting or ending the injection of reducing agent takes place by shutting off a metering pump.

14. Method as claimed in claim 11, wherein triggering or actuating at least one metering pump or at least one air pump or at least one switching valve takes place depending on the engine operating parameters, especially depending on the parameters exhaust gas temperature and exhaust gas mass flow.

15. Method as claimed in claim 12, wherein at least one metering pump, at least one air pump or at least one switching valve is actuated depending on the engine operating parameters, including exhaust gas temperature and exhaust gas mass flow.

16. Method as claimed in claim 13, wherein at least one metering pump, at least one air pump or at least one switching valve is actuated depending on the engine operating parameters, including exhaust gas temperature and exhaust gas mass flow.

17. Method as claimed in claim 12, wherein interrupting or ending the injection of reducing agent takes place by shutting off a metering pump.

18. A reducing agent metering system for injecting a reducing agent into an exhaust gas flow of a supercharged diesel engine for selective catalytic reduction comprising:
   a reducing agent tank to provide a reducing agent;
   a compressed air supply to provide charging air;
   at least one pressure sensor to measure minimum and maximum pressure of the charging air;
   an electric air pump;
   wherein the compressed air supply is taken, at least in part, from the supercharger of the diesel engine and at least in part, from the electric air pump and further wherein the compressed air supply includes a bypass parallel to the electric air pump and downstream of the electric air pump and the bypass, the pressure sensor is operatively connected to the electric air pump to activate the electric air pump depending on the minimum pressure measured and;

at least one binary outward mixing nozzle to inject the reducing agent into the exhaust gas flow by the compressed air supply.

* * * * *